Nov. 8, 1966

T. WEISZ 3,284,695

ADJUSTABLE UNREGULATED D.C. VOLTAGE REDUCER

Filed March 28, 1963

INVENTOR.
THOMAS WEISZ

BY

*Eli Weisz*

ATTORNEY

United States Patent Office 3,284,695
Patented Nov. 8, 1966

3,284,695
ADJUSTABLE UNREGULATED D.C. VOLTAGE REDUCER
Thomas Weisz, Ann Arbor, Mich., assignor to American Radiator & Standard Sanitary Corporation, New York, N.Y., a corporation of Delaware
Filed Mar. 28, 1963, Ser. No. 268,609
9 Claims. (Cl. 323—22)

This invention relates to voltage reduction circuits and more particularly to an improved circuit for receiving a given D.C. input voltage and providing a reduced D.C. output voltage.

Heretofore various conventional means have been used for reducing a given D.C. voltage, such means including potentiometers, rheostats and resistors and D.C. to D.C. converters. The potentiometer, rheostat and resistor have the disadvantage of extremely low efficiency. This characteristic renders the potentiometer, rheostat and resistor impractical to handle power. The D.C. to D.C. converter has the disadvantage of being complex and expensive because it inverts a D.C. level into A.C. transforms the A.C. and rectifies the A.C. to obtain another level of D.C.

It is an object of this invention to provide an improved circuit for reducing a given D.C. voltage to provide a desired D.C. output voltage for non-inductive loads that are not sensitive to the shape of the voltage to them.

A further object is to provide a D.C. voltage reduction circuit which is reliable and inexpensive.

Another object is to provide a D.C. voltage reduction circuit which is economical in size for power delivered.

A further object is to provide an improved D.C. voltage reduction circuit having means for adjusting the value of the reduced voltage.

Other objects and advantages of the invention will be in part, obvious and, in part, will appear hereinafter.

Briefly, the invention comprises in one of its aspects a circuit comprising a fast acting switching means responsive to a predetermined control current to condition the means to pass current and responsive to the removal of the control current and reversing of polarity on the switching means to interrupt the passage of current by the switching means, plus fixed reference voltage means for providing the predetermined control current and oscillating circuit means for eliminating the predetermined control current and reversing the polarity on the switching means.

In another aspect of the invention the fixed reference voltage means is replaced by a variable reference voltage means thereby to provide for adjustment of the reduced output voltage to a desired value.

For a better understanding of the nature and objects of this invention, reference should be had to the following detailed description taken in conjunction with the accompanying drawings, in which.

Figure 1:
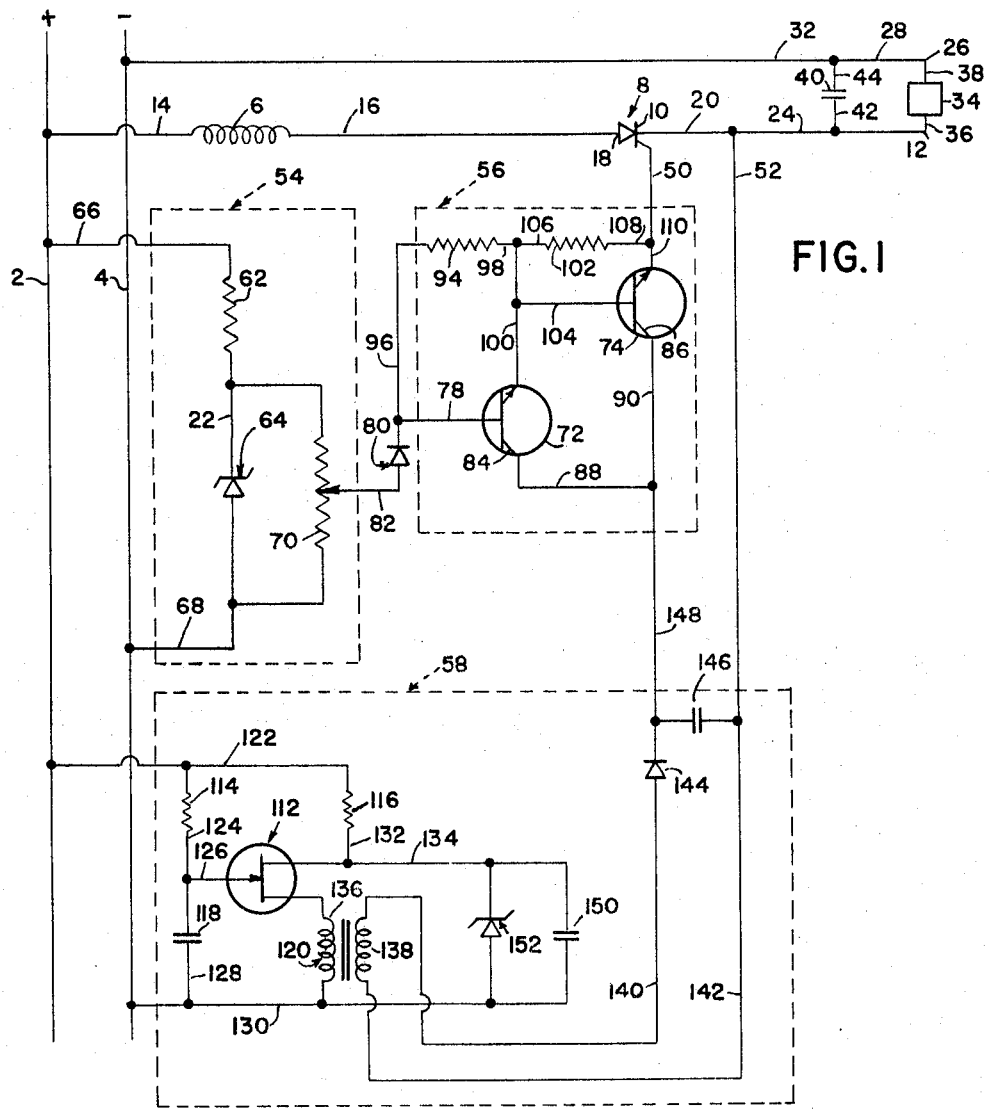
FIGURE 1 is a schematic diagram of circuits and apparatus illustrating one embodiment of this invention.

Referring now to the drawings and FIGURE 1 in particular, there is illustrated a voltage reduction system including input lines 2 and 4 to which current is supplied from a source of direct current (not shown).

The positive line 2 of the input voltage is connected through an inductance coil 6, and a silicon controlled rectifier 8 to a voltage output terminal 12. More particularly the coil 6 is connected by lines 14 and 16 between line 2 and the anode 18 of the SCR 8, the SCR 8 having a gate 10 and a cathode 20. The cathode 20 of the SCR is connected by line 24 to the terminal 12.

A negative output voltage terminal 26 is connected through lines 28 and 32 to the negative input voltage terminal 4, a load impedance 34 being connected by lines 36 and 38 between the output voltage terminals 12 and 26.

A condenser 40 is connected by lines 42 and 44 to the lines 32 and 24 and hence to the cathode of the SCR 8 and to the negative voltage input line 4 to cooperate with the inductance coil 6 in forming an oscillating circuit to develop variable voltage on the cathode 20 as will be explained hereinafter.

Suitable control circuit means is connected to the gate 10 and cathode 20 respectively of the rectifier 8 by lines 50 and 52 to condition the rectifier 8 for "on" or "off" condition. In a preferred form the circuit means comprises an adjustable reference voltage means generally indicated at 54, a switching means indicated generally at 56, and a direct current voltage means indicated generally at 58. The switching means 56 and means 58 constitute a gate trigger circuit.

The adjustable reference means includes a resistor 62 and Zener diode 64 connected in series by line 22 and respectively by lines 66 and 68 to the D.C. input lines 2 and 4. An adjustable potentiometer 70 is connected across the diode 64.

The switching means 56 includes transistors 72 and 74 connected to pass current to the gate 10 of the rectifier 8 to supply the necessary minimum gate current to condition the rectifier 8 to pass current. The base of transistor 72 is connected by line 78 a diode 80 and a line 82 to the potentiometer 70. The collectors 84 and 86 of the transistors 72 and 74 are connected respectively by lines 88 and 90 to a line 148 leading to the D.C. voltage means 58. Resistor 94 is connected by lines 78, 96, 98 and 100 between the base and emitter of the transistor 72 and provides a desired voltage differential therebetween. A resistor 102 is connected by a line 104, line 100 and lines 106, 108 and 110 between the base and emitter of transistor 74. Lines 100 and 104 connect the emitter of transistor 72 to the base of transistor 74 such that triggering of transistor 72 by the adjustable reference voltage means 54 causes transistor 72 to trigger transistor 74 to place it in "on" condition, to pass current. The emitter of transistor 74 is connected by the lines 110 and 50 to the gate 10 of the SCR 8. Rectifier 80 connected to the potentiometer 70 and the two resistors 94 and 102 connected between the emitters and bases of the respective transistors 72 and 74 serve to prevent damage to the transistors due to overvoltage occuring when the cathode of silicon controlled rectifier 8 reaches a high overshoot voltage and the slider of potentiometer 70 is near to its minimum setting.

Thus a switching circuit 56 is provided to pass current to the gate of the SCR 8 and an adjustable reference voltage means 54 is provided to actuate the switching means.

The separate D.C. voltage supply means 58 which is to provide a low voltage D.C. potential through the reference voltage controlled switching means 56 will now be described.

The D.C. voltage means 58 is briefly a conventional relaxation oscillator circuit plus rectifying means and comprises a unijunction transistor 112, two resistors 114 and 116, a capacitor 118 and a Sprague type stepdown transformer 120.

The resistors 114 and 116 are connected by line 122 to the positive input line 2. The other side of resistance 114 is connected by line 124 to the capacitor 118 and by lines 124 and 126 to the anode of the transistor 112. The other side of capacitor 118 is connected by lines 128 and 130 to the input line 4. The other side of resistor 116 is connected by lines 132 and 134 to the cathode of the transistor 112. Also connected to the output side of the transistor 112 is one side of the primary 136 of the transformer 120, the other side of the primary being connected by line 130 to the negative line 4. The secondary 138 of the transformer is connected by lines 140 and 142 to the previously mentioned rectifying means which includes a diode 144 and a capacitor 146. The anode of the diode 144 is connected to the line 140 and its cathode is connected by line 148 to the junction of the lines 90 and 88 of the switching means 56. The line 142 is connected to the line 52 leading to the cathode of the SCR 8, and the capacitor 146 is connected between the lines 52 and 148 to filter the rectified voltage to be sent to the switching circuit.

The Sprague transformer 120 steps the voltage down to say 30 volts from the 100 volt input. An electrolytic capacitor 150 and a Zener diode 152 are connected each between the lines 134 and 130 to clamp and hold steady at about 30 volt level the voltage derived from the unijunction transistor.

Thus, means are provided for producing on the gate 10 of the rectifier 8 a voltage sufficient to pass the minimum current necessary to condition the rectifier 8 to pass current.

Figure 2:
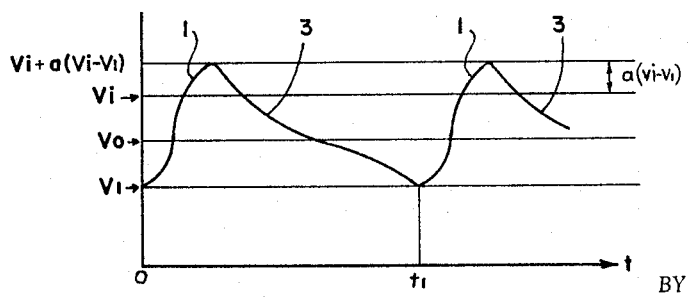
FIGURE 2 is a schematic graph illustrating, in relation to time and to the input and output voltages, the pulsating voltage developed by the circuit of FIGURE 1.

Referring to FIGURE 2, there is shown a schematic graph illustrating in relation to time and to the input and output voltage of the circuit of FIGURE 1, the pulsating voltage developed at the cathode of rectifier 8. In the graph, $t_1$ indicates the time cycle of oscillation, $V_1$ indicates the input voltage which is to be reduced, $$V_i - a(V_i - V_1)$$

indicates the peak voltage, $V_1$ indicates the cathode voltage at which the rectifier 8 begins to pass current, $V_o$ indicates the effective output voltage of the circuit, and $a(V_i - V_1)$ indicates the overshoot in voltage resulting from the oscillatory characteristic of the circuit.

When the rectifier 8 begins to pass current at $V_1$ cathode voltage, the cathode voltage rises along the curve 1 until it reaches the peak voltage of $V_i - a(V_i - V_1)$. During this time the condenser 40 is being charged and gate bias is removed from the SCR. At the peak voltage the bias at the rectifier 8 is reversed and also the voltage across the rectifier 8 reverses for a time sufficiently long to maintain the rectifier in "off" condition. The voltage then decreases along the curve 3 as the condenser 40 is discharged into the load 34, producing a voltage across the load of effective value $V_o$.

It is to be understood that the trigger circuit illustrated in FIGURE 1 and described herein is but one preferred embodiment of a suitable circuit. Other circuits responsive to reference and cathode voltage to trigger the SCR may be used.

*Operation*

In considering operation of the above circuit let us assume an input voltage, $V_1$ of 100 volts D.C. and a reference voltage of 90 volts D.C. positive. Also, let us assume that capacitor 40 is discharged and the SCR is not passing current. When the reference voltage is applied to the base of the transistor 72 there is a difference in voltage between the reference voltage and gate voltage of the SCR 8 such that current flows between the base and emitter of transistor 72 to cause it to pass current from its collector to its emitter. Current from the emitter of transistor 72 triggers transistor 74 which passes current through the gate 10 to the cathode 20 of the SCR to thereby condition the SCR to "on" condition.

The SCR in passing current sets up an oscillatory circuit between the inductance 6 and condenser 40 which eventually charges the condenser 40 with a peak positive voltage of $V_1 + a(V_i - V_1)$. In the above circuit this could be a value of about 120 to 150 volts, an overshoot of 20 to 50 volts above the input voltage.

As the condenser voltage, and hence the voltage at the cathode 20 of the SCR 8 rises it eventually reaches a value sufficiently close to the reference voltage 90 that the biasing current between base and emitter of the transistors 74 and 72 is eliminated. Transistors 74 and 72 thus being conditioned to "off" condition, gate current is also removed from the SCR. However, to restore voltage blocking capability of the SCR it is necessary to reverse the polarity thereon for a sufficient length of time to neutralize the end junctions of the SCR. As the cathode voltage rises above the 100 volt input to the SCR the voltage thereon is reversed. This period of reverse potential is continuous and sufficiently long that the SCR will not thereafter pass current from anode to cathode until the necessary gate current is restored.

Since current from the SCR to the condenser 40 has been interrupted and the condenser is discharging into the load 34, the cathode voltage gradually diminishes until it reaches a value $V_i$ slightly below the reference voltage of 90 volts. When this occurs the reference voltage is again able to condition the trigger circuit to pass current to the gate 10 of the SCR. The SCR again passes current to the condenser 40 and the cycle repeats.

The variable pulsating voltage contains a D.C. component of $V_o$ effective value.

The time element $t_1$ with a given condenser 40 depends on the load if the oscillation time along the curve 1 in FIGURE 2 is negligible compared to the discharge time of condenser 40 along curve 3 in FIGURE 2. This makes the effective value $V_o$ of the output voltage at a given voltage setting, independent of the magnitude of the load resistance.

It is contemplated in one aspect of my invention that a fixed reference voltage may be provided. This corresponds to one setting of the potentiometer 70. Obviously other means may be provided in place of the potentiometer where only a fixed reference voltage is required. In using a fixed reference voltage one obtains only a fixed output voltage.

In accordance with the second aspect of the invention, an adjustable reference voltage means as described above is provided such that by adjustment of the reference voltage the voltage $V_1$ may be adjusted to thereby provide an adjustable output voltage $V_o$. It has been found that practical limits for varying the output voltage are from approximately 20 to 90 percent of the input voltage. Should further variation of output voltage or a finer adjustment be desired two or more of the above described circuits may be connected in cascade.

The usefulness of the subject voltage reducer system also extends beyond situations where D.C., as the only available primary power is required to be transformed down. It may also be used where an A.C. voltage has to be transformed down and rectified to produce a D.C. voltage lower than that obtainable through simple rectification of the primary A.C. voltage. For example, a full wave rectifier may be employed to change the A.C. to a given D.C. voltage and applicant's circuit as described above may then be used to reduce the given D.C. voltage to a desired output voltage.

Conventionally one would use an adjustable transformer with rectifier to accomplish the same function. The advantage of applicant's invention as applied to the case of reducing an A.C. voltage to a desired D.C. voltage is the elimination of the adjustable transformer which is bulky, heavy and at certain power levels more expensive than applicant's voltage reducer circuit.

Since numerous changes may be made in the above described apparatus and circuits, and different embodiments of the invention may be made without departing from the spirit thereof, it is intended that all the matter contained in the foregoing description or shown in the accompanying drawings shall be interpreted as illustrative and not in a limiting sense. In particular, while an SCR is considered the preferred form of switching device, it is recognized that other forms of devices performing the required switching function responsive to a reference voltage and an oscillating circuit voltage may be available or may in the future be developed, such for example, as the thyratron tube and the ignition tube.

What is claimed is:

1. An improved D.C. voltage reducing circuit comprising an induction coil, a silicon controlled rectifier and a capacitor coupled in series to form an oscillatory circuit fed from a D.C. source, a gate current source, a gate trigger circuit for switchably coupling the gate terminal of said rectifier to said gate current source, said gate trigger circuit being provided with an input which is arranged for connection to a source of D.C. reference voltage said gate trigger circuit being operative responsive to a predetermined positive differential of the reference voltage from said source of D.C. reference voltage above the voltage on the cathode of the rectifier, to permit the flow of sufficient current from said gate current source to said gate terminal to condition said rectifier to the "on" condition, said oscillatory circuit providing an overshoot of said input voltage to periodically reverse the polarity of the signal on said rectifier, and load impedance means fed periodic discharges from said capacitor to provide across said load impedance a reduced D.C. output voltage.

2. An improved D.C. voltage reducing circuit comprising an induction coil, a capacitor, a silicon controlled rectifier interposed between said induction coil and said capacitor to form a series oscillatory circuit, said induction coil being fed from the positive side of a D.C. voltage input source and said capacitor being fed from the negative side of said source, a source of adjustable D.C. reference voltage, a gate current source, a gate trigger circuit interposed between the gate terminal of said rectifier and said gate current source, said gate trigger circuit having an input connected to said reference voltage source, said gate trigger circuit being operative responsive to a predetermined positive differential of said reference voltage above said cathode voltage to permit the passage from said gate current source to said gate terminal of the necessary gate current to condition said rectifier to "on" condition, said oscillatory circuit providing an overshoot of the input voltage to periodically reverse polarity on said rectifier, and load impedance means fed periodic discharges from said capacitor to provide across said load impedance a reduced output voltage dependent in value on the adjusted value of said reference voltage.

3. An improved D.C. voltage reducing circuit comrising an induction coil, a gate controlled rectifier and a capacitor coupled in series to form an oscillatory circuit, said circuit being fed by a source of D.C. voltage and said rectifier being urged to block the passage of signals, a D.C. reference voltage source, a gate current source, a gate trigger circuit including an input connected to said reference source and switchably connecting said gate current source to the gate terminal of said rectifier to condition said rectifier to pass current, said gate trigger circuit including means subject to opposing voltages from said reference voltage source and the cathode of said rectifier to condition said gate trigger circuit to conductively connect said gate current source to said gate terminal to actuate said rectifier to "on" condition only when the reference voltage exceeds the cathode voltage by at least a predetermined minimum voltage differential, and load circuit means fed periodic discharges from said capacitor to provide a source of reduced D.C. voltage.

4. An improved D.C. voltage reducing circuit comprising an induction coil, a gate controlled rectifier and a capacitor coupled in series to form an oscillatory circuit, said circuit being fed by a source of D.C. voltage and said rectifier being urged to block the passage of signals, a D.C. reference voltage source, a gate current source, a gate trigger circuit, including an input connected to said reference source connecting said gate current source to the gate terminal of said rectifier to condition said rectifier to pass current, said gate trigger circuit being connected to the cathode terminal of said rectifier to also urge said gate trigger circuit inoperative when the cathode voltage of said rectifier reaches a predetermined value in relation to said reference voltage, and load circuit means fed periodic discharges from said capacitor to provide a source of reduced D.C. voltage, said D.C. reference voltage source being variable to vary the value of said reduced D.C. voltage.

5. An improved circuit for reducing a given D.C. input voltage to a described D.C. output voltage comprising a load impedance, a capacitor connected to discharge through said load impedance, one side of said capacitor being arranged for connection to the negative side of the D.C. input voltage, a gate controlled rectifier connected to the other side of said capacitor, an induction coil interposed between the positive side of the D.C. input voltage and said rectifier, said rectifier being operable to "on" condition responsive to a predetermined minimum gate current and operable to "off" condition and interruption of load current passing therethrough responsive to reversal of polarity thereon and loss of said minimum gate current, a gate current source, a D.C. reference voltage source, gate trigger circuit means switchably connecting said gate and said other side of said capacitor to said gate current source, said gate trigger circuit means including an input connected to said D.C. reference voltage source, said gate trigger circuit means being urged by a predetermined differential of said reference voltage above the voltage across said capacitor to permit said gate current source to feed the predetermined current required to said gate terminal to condition said rectifier to assure its "on" condition, said inductor coil and said capacitor forming an oscillatory circuit through said rectifier to vary the voltage on the said other side of said capacitor to provide for arresting operation of the gate trigger circuit means and reversing polarity on the rectifier.

6. An improved circuit for receiving voltage from an input source of D.C. voltage and reducing the input voltage to a desired D.C. output voltage comprising a load impedance, a capacitor coupled to discharge through said load impedance, a gate controlled rectifier, coupled to pass load current to one side of said capacitor, a source of D.C. reference voltage, a gate current source, gate trigger circuit means, including an input connected to said D.C. reference voltage source for switchably connecting said gate current source to the gate of said rectifier to trigger said rectifier to "on" condition, said gate trigger circuit means being connected through the gate and cathode of said rectifier to the positive side of said capacitor and responsive to a predetermined capacitor voltage to revert to inoperative condition removing the "on" bias from said rectifier, said rectifier being responsive to a reversal of polarity thereon and loss of gate current to interrupt the passage of load current therethrough and revert to "off" condition, and means including an induction coil for passing current from the positive side of said input voltage source through said rectifier to the positive side of said capacitor, said induction coil cooperating with said capacitor to form an oscillatory circuit for periodically reversing voltage on said rectifier and providing the necessary voltage to periodically render said gate trigger circuit means inoperative, the drop in voltage across said load providing a source of reduced voltage output.

7. An improved D.C. voltage reducer circuit for connection to a source of D.C. voltage to be reduced comprising a gate controlled rectifier means having an anode, a cathode and a gate, said rectifier means being responsive to a minimum gate current to condition said rectifier to pass load current and responsive to loss of said gate current and reversal of polarity on said rectifier for a predetermined time to interrupt said load current and condition said rectifier to "off" condition, a gate current source, a reference voltage source, gate trigger means including transistor means having an input connected to said reference voltage source for connecting said gate current source through the gate of said rectifier to the cathode of said rectifier to cause said gate current source to deliver said minimum gate current to said rectifier whenever said reference voltage exceeds said cathode voltage by a predetermined value, an induction coil having one side arranged for connection to the positive side of the D.C. voltage input source and its other side connected to the anode of said rectifier, a capacitor having one side arranged for connection to the negative side of said D.C. voltage input source and its other side connected to the cathode of said rectifier, and a load impedance, the voltage drop across said load impedance providing a source of reduced output D.C. voltage from said circuit.

8. An adjustable D.C. voltage reducer system comprising an inductance coil, having one side thereof arranged for connection to the positive side of an input direct current source, an SCR having its anode connected to the other side of said inductance coil, a capacitor having one side thereof connected to the cathode of said SCR and the other side arranged for connection to the negative side of said input power source, whereby a variable voltage is developed on the cathode of said SCR, a gate current source, a gate trigger circuit having an input arranged to receive current from a D.C. reference voltage source and controlling said gate current source to supply a predetermined current to the gate of said SCR sufficient to condition said SCR to "on" condition, means connected to apply the variable cathode voltage of said SCR to said gate trigger circuit in opposition to said reference voltage to remove said gate current from said SCR responsive to a rise in said cathode voltage to a value sufficient to block the operative effect of said reference voltage on said trigger circuit, a load impedance connected to receive D.C. potential discharge from said capacitor, and means for adjusting said reference voltage to control the voltage drop across said impedance to a desired value of D.C. output voltage.

9. A D.C. voltage reducer circuit for connection to a two-terminal source of D.C. voltage comprising: an inductor including one end adapted to be connected to one terminal of said source of D.C. voltage and another end; a silicon controlled rectifier including anode, cathode and gate terminals; means for connecting said anode terminal to the other end of said inductor; a capacitor including first and second terminals, means for connecting the first terminal of said capacitor to said cathode terminal and the second terminal of said capacitor being adapted to be connected to the other terminal of said D.C. voltage source; a gate current source including a free-running unijunction transistor relaxation oscillator, and a rectifier means for converting alternating current generated by said oscillator to direct current; a transistor switching means including emitter, collector and base terminals; the emitter-collector circuit of said transistor switching means connecting said gate current source to the gate terminal of said silicon controlled rectifier; a source of reference voltage; means for connecting the base terminal of said transistor switching means to said source of reference voltage whereby the potential difference between said gate terminal and said base terminal controls the switching of said transistor switching means and thereby the flow of current to said gate terminal for said gate current source.

References Cited by the Examiner

UNITED STATES PATENTS 3,133,241   5/1964   White _____ 321—45

OTHER REFERENCES

Notes on the Application of the Silicon Controlled Rectifier, Semiconductor Products Department of the General Electric Co., December 1958, pp. 41 and 54–56.

JOHN F. COUCH, *Primary Examiner.*

K. D. MOORE, *Assistant Examiner.*